UNITED STATES PATENT OFFICE.

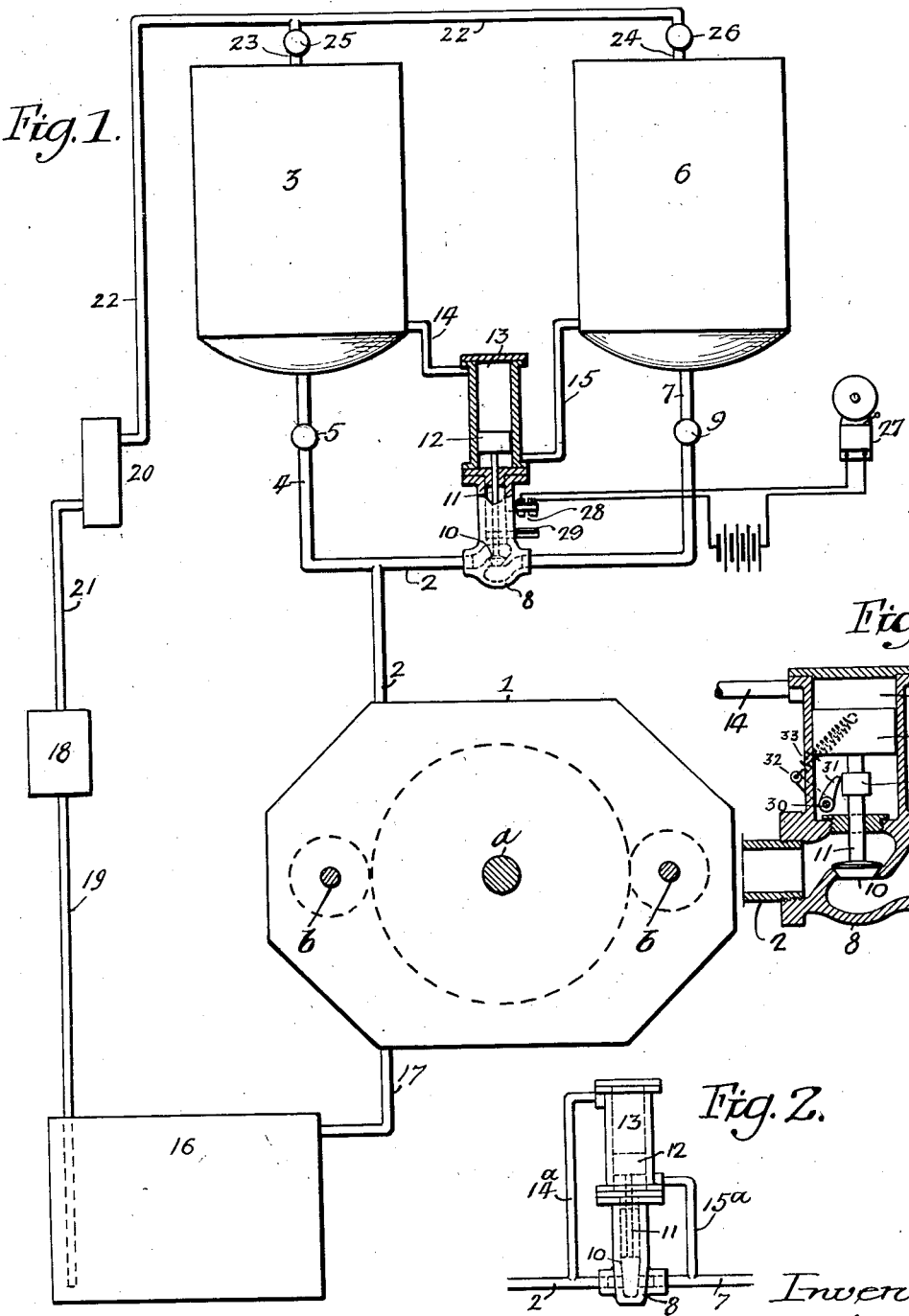

JOHN E. P. GRANT, OF SWARTHMORE, PENNSYLVANIA.

LUBRICATING SYSTEM.

1,370,641.   Specification of Letters Patent.   Patented Mar. 8, 1921.

Application filed January 15, 1920. Serial No. 351,726.

*To all whom it may concern:*

Be it known that I, JOHN E. P. GRANT, a subject of the King of Great Britain and Ireland, (who has declared his intention of becoming a citizen of the United States,) residing in Swarthmore, Delaware county, Pennsylvania, have invented certain Improvements in Lubricating Systems, of which the following is a specification.

This invention relates to certain improvements in lubricating systems, in which it is essential that oil, or other lubricant, shall be continuously supplied. While the invention can be used in any lubricating system, it is especially adapted for use in connection with the lubricating systems of geared turbines. In this type of mechanism it is essential that lubricating oil shall be continuously supplied to the gearing. The general practice has been to have a circulating system, which includes a tank, a pipe leading to a gear box, a drain tank in which the oil is discharged from the box, a filter, and a pump for pumping the oil into the reservoir. If, for any reason, this system should clog in the ordinary arrangement, in all probability the gears would be ruined.

By my invention, I provide means for automatically supplying oil from one tank, as soon as another tank has been discharged, insuring a constant supply of oil to the gearing, and at the same time warning the engineer that the system is not working properly.

In the accompanying drawings:—

Figure 1 is a diagram, in elevation, illustrating my improvement; and

Figs. 2 and 3 are views of modifications.

1 is a casing of a geared turbine, showing the gearing in dotted lines. *a* is the propeller shaft and *b* and *c* are the turbine shafts. 2 is a pipe leading to the casing. 3 is a tank, or reservoir, having a pipe 4, which is connected to the pipe 2. In this pipe is a valve 5. 6 is a second tank. 7 is a pipe communicating with the bottom of the tank 6 and also with the pipe 2 through a valve 8. In the pipe 7 is a valve 9. When the two valves 5 and 9 are closed, both tanks are cut off from the gear casing 1. In the valve casing 8 is a valve 10 having a stem 11, which forms the piston rod of a piston 12, located in a cylinder 13. A pipe 14 connects the bottom of the reservoir 3 with the upper end of the cylinder 13, in the present instance, and a pipe 15 connects the lower end of the reservoir 6 with the lower end of the cylinder 13 on the opposite side of the piston 12. These pipes may connect with the pipes on each side of the valve 8, as shown at 14ª and 15ª, Fig. 2, if found desirable and the valve may be the gate type adapted to a tapered seat as shown in said figure. 16 is a drain tank connected to the gear casing 1 by a pipe 17. 18 is a pump communicating with the drain tank 16 through a pipe 19. 20 is a filter communicating with the pump 18 through a pipe 21. Extending from this filter is a pipe 22, which is connected by short sections of pipe 23 and 24 with the reservoirs 3 and 6. In the pipe 23 is a hand valve 25 and in the pipe 24 is a hand valve 26.

While I have illustrated the filter and drain tank, they may be dispensed with in some cases and two reservoirs may be used without the circulating means.

The operation is as follows: The reservoir 3 is filled with oil and the valves 25 and 5 are opened and the reservoir 6 is filled with oil and the valve opened. The pressure of the oil in the tank 3 tends to keep the valve 10 in the closed position, as shown in Fig. 1, and, consequently, the oil flows through the pipes 4 and 2 and into the gear casing. The oil flows from the gear casing through the pipe 17 to the drain tank from which it is pumped by the pump 18 into and through the filter 20 and back through the pipes 22 and 23 into the reservoir 3. Thus, the oil is kept in constant circulation. Should the circulation stop for any reason and the reservoir 3 become empty, then the pressure on the upper end of the piston 12 will be reduced and the pressure on the under side of the piston from the reservoir 6 and through the pipe 15 will cause the valve 10 to be raised, forming communication between the pipe 7 and the pipe 2 so that oil will immediately flow from the reservoir 6 into the gear casing 1 through the pipes 7 and 2.

I preferably provide an electric alarm bell 27 which is actuated when the piston is raised in the cylinder, and in the present instance I provide two terminal plates 28 in circuit with the bell, and so arranged that when an arm 29 on the valve stem 11 comes in contact with the plates the alarm will be sounded calling attention of the engineer to the fact that the lubricating system is not working properly.

The engineer will see immediately that the circulation has been discontinued through the reservoir 3 and that oil is feeding from reservoir 6. If there is a stoppage, this can be readily fixed and circulation again renewed, or, if desired, the reservoir 3 can be cut out by closing the hand valves 25 and 5 and opening the hand valve 26 so that the circulation will be through the reservoir 6 instead of through the reservoir 3. In some instances, a third tank may be used, if found desirable, which may be connected in the same manner as tanks 3 and 6, but I find that two tanks are sufficient under ordinary conditions.

It will be understood that different types of valves may be used without departing from the essential features of the invention.

In Fig. 3, I have shown a globe valve casing 8ª having a valve, stem and piston similar to the valve shown in Fig. 1. In this instance, I have provided the valve stem with a collar 11ª and in the casing is a rock shaft 30 having a pawl 31 adapted to pass under the collar when the valve is raised so that when the valve is once opened it will remain in this position until closed by the engineer. On the shaft 30, outside of the valve casing, is an arm 32, and a spring 33 tends to force the pawl toward the collar.

I claim:

1. The combination in an oiling system, of a supply pipe; two reservoirs communicating with the supply pipe; a valve controlling the flow of liquid from one reservoir to the supply pipe; and means for automatically opening the valve controlled by the pressure in the other reservoir to allow the liquid to flow from the reservoir which the valve controls.

2. The combination in an oiling system, of a supply pipe; two reservoirs; pipes connecting the reservoirs with the supply pipe; a valve in the supply pipe; a piston pipe; a valve in the supply pipe; a piston connected to the valve; a cylinder in which the piston is mounted; a pipe forming communication between the cylinder on one side of the piston and the bottom of one reservoir; and a pipe forming communication between the cylinder on the opposite side of the piston and the bottom of the other reservoir, so that when the pressure in one reservoir is reduced, the pressure in the other reservoir will shift the valve, which will allow lubricant to flow from said reservoir.

3. The combination of a gear casing; two reservoirs; a supply pipe leading to the gear casing; two pipes communicating with the supply pipe; a valve for controlling the supply of oil from one of the reservoirs; a piston connected to the valve; a cylinder in which the piston is mounted; a pipe leading from the lower end of one reservoir to the upper end of the cylinder; a pipe leading from the lower end of the other reservoir to the other end of the cylinder; a drain tank communicating with the gear casing; a circulating pump for lifting the oil from the drain tank and returning it to one of the reservoirs; and hand valves for cutting out either of the reservoirs.

4. The combination of two reservoirs; a gear casing; pipes forming communication between the reservoirs and the gear casing; a valve in one of said pipes; a valve stem connected to the valve; a piston therein; a cylinder in which the piston is mounted; a collar on the valve stem; a pawl arranged to engage the collar when the valve is raised; and means for reseating the valve by withdrawing the pawl.

JOHN E. P. GRANT.